(12) United States Patent
Wang et al.

(10) Patent No.: US 10,762,833 B2
(45) Date of Patent: Sep. 1, 2020

(54) DISPLAY PANEL AND DRIVING METHOD THEREFOR, AND DISPLAY APPARATUS

(71) Applicant: BOE TECHNOLOGY GROUP CO., LTD., Beijing (CN)

(72) Inventors: Qiang Wang, Beijing (CN); Libin Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/609,255

(22) PCT Filed: Mar. 20, 2019

(86) PCT No.: PCT/CN2019/078819
§ 371 (c)(1),
(2) Date: Oct. 29, 2019

(87) PCT Pub. No.: WO2019/192317
PCT Pub. Date: Oct. 10, 2019

(65) Prior Publication Data
US 2020/0051494 A1    Feb. 13, 2020

(30) Foreign Application Priority Data

Apr. 3, 2018   (CN) .......................... 2018 1 0287959

(51) Int. Cl.
*G09G 3/32*    (2016.01)
*B06B 1/06*    (2006.01)
(Continued)

(52) U.S. Cl.
CPC ............. *G09G 3/32* (2013.01); *B06B 1/0688* (2013.01); *G06K 9/0002* (2013.01);
(Continued)

(58) Field of Classification Search
CPC ....... G09G 3/32; G09G 3/3208; B06B 1/0688
See application file for complete search history.

(56) References Cited

U.S. PATENT DOCUMENTS 8,360,981 B2    1/2013   Miyachi
10,275,632 B2    4/2019   Chen et al.
(Continued)

FOREIGN PATENT DOCUMENTS

CN    1577458    2/2005
CN    1795484    6/2006
(Continued)

OTHER PUBLICATIONS

International Search Report and Written Opinion dated Jun. 21, 2019 for PCT Patent Application No. PCT/CN2019/078819.
(Continued)

*Primary Examiner* — Kent W Chang
*Assistant Examiner* — Chayce R Bibbee
(74) *Attorney, Agent, or Firm* — Thomas | Horstemeyer LLP

(57) ABSTRACT

The present disclosure relates to the field of display technologies, and provides a display panel and a driving method thereof, and a display device. The display panel includes: an ultrasonic echo acquisition circuit and a light emitting circuit. The acquisition circuit includes a first circuit and an ultrasonic wave receiving sensor, wherein the first circuit has a first node coupled to the ultrasonic wave receiving sensor, a second node and a third node coupled to a scan signal terminal, a fourth node and a fifth node coupled to a control signal terminal, and a sixth node being an output terminal. The light emitting circuit includes a second circuit and a light emitting diode.

20 Claims, 9 Drawing Sheets

(51) Int. Cl.
*G06K 9/00* (2006.01)
*H01L 27/32* (2006.01)

(52) U.S. Cl.
CPC ... *H01L 27/3234* (2013.01); *G09G 2310/061* (2013.01); *G09G 2330/021* (2013.01)

(56) References Cited

U.S. PATENT DOCUMENTS

| | | | |
|---|---|---|---|
| 2011/0189801 | A1 | 8/2011 | Tzolov et al. |
| 2011/0193838 | A1 | 8/2011 | Hsu |
| 2016/0246396 | A1 | 8/2016 | Dickinson et al. |
| 2017/0061190 | A1 | 3/2017 | Chen et al. |

FOREIGN PATENT DOCUMENTS

| | | |
|---|---|---|
| CN | 101140612 | 3/2008 |
| CN | 101221722 | 7/2008 |
| CN | 104239869 | 12/2014 |
| CN | 105046243 | 11/2015 |
| CN | 106709308 | 5/2017 |
| CN | 107204172 | 9/2017 |
| CN | 107209610 | 9/2017 |
| CN | 107748874 | 3/2018 |
| CN | 108648674 | 10/2018 |
| EP | 3259656 | 12/2017 |
| KR | 20150107071 | 9/2015 |
| WO | 2016133602 | 8/2016 |
| WO | 2018218936 | 12/2018 |
| WO | 2019085968 | 5/2019 |

OTHER PUBLICATIONS

1st Office Action dated Apr. 28, 2019 for Chinese Patent Application No. 201810287959.6.

| In a writing stage of a light emitting circuit, writing a scan signal simultaneously to an ultrasonic echo acquisition circuit and the light emitting circuit | S1 |

| In a light emitting stage of the light emitting circuit, writing a control signal simultaneously to the ultrasonic echo acquisition circuit and the light emitting circuit | S2 |

# DISPLAY PANEL AND DRIVING METHOD THEREFOR, AND DISPLAY APPARATUS

CROSS REFERENCE TO RELATED APPLICATIONS

The present application is a § 371 national phase application based upon International Application No. PCT/CN2019/078819, filed on Mar. 20, 2019, which claims the benefit of and priority to Chinese Patent Application No. 201810287959.6, titled "DISPLAY PANEL AND DRIVING METHOD THEREOF, AND DISPLAY DEVICE", filed on Apr. 3, 2018.

TECHNICAL FIELD

The present disclosure relates to the field of display technologies and, in particular, relates to a display panel and a driving method thereof, and a display device.

BACKGROUND

Fingerprint recognition technology is an important direction for the development of display panels and modules. Currently, common implementation methods are capacitive sensing, optical detection, pressure sensing, and ultrasonic detection and the like. The ultrasonic detection method has received more and more attention due to its advantages of no contact, no occlusion, and high precision.

The above information disclosed in the Background section is only for enhancement of understanding of the background of the present disclosure, and thus it may include information that does not constitute a prior art known to those of ordinary skill in the art.

SUMMARY

According to an aspect of the present disclosure, there is provided a display panel, including: an ultrasonic echo acquisition circuit and a light emitting circuit. The ultrasonic echo acquisition circuit includes a first circuit and an ultrasonic wave receiving sensor, wherein the first circuit has a first node coupled to a first electrode terminal of the ultrasonic wave receiving sensor, a second node and a third node coupled to a scan signal terminal, a fourth node and a fifth node coupled to a control signal terminal, and a sixth node being an output terminal of the ultrasonic echo acquisition circuit. The light emitting circuit includes a second circuit and a light emitting diode, wherein the second circuit has a first node coupled to a data signal terminal, a second node and a third node coupled to the scan signal terminal coupled to the ultrasonic echo acquisition circuit, a fourth node and a fifth node coupled to the control signal terminal coupled to the ultrasonic echo acquisition circuit, and a sixth node coupled to an input terminal of the light emitting diode.

In an exemplary embodiment of the present disclosure, the first circuit or the second circuit includes: a first switch, a second switch, a capacitor, a driving transistor, a third switch, and a fourth switch. The first switch has a first terminal for receiving a reference voltage signal, and a control terminal coupled to the fourth node; the second switch has a first terminal coupled to a second terminal of the first switch, a control terminal coupled to the second node, and a second terminal coupled to the first node; the capacitor has a first electrode terminal coupled to the second terminal of the first switch; the driving transistor has a first terminal coupled to a first power signal terminal, and a control terminal coupled to a second electrode terminal of the capacitor; the third switch has a first terminal coupled to the second electrode terminal of the capacitor, a control terminal coupled to the third node, and a second terminal coupled to a second terminal of the driving transistor; the fourth switch has a first terminal coupled to the second terminal of the third switch, a control terminal coupled to the fifth node, and a second terminal coupled to the sixth node.

In an exemplary embodiment of the present disclosure, the light emitting circuit further includes: a fifth switch. The fifth switch has a first terminal coupled to the second electrode terminal of the capacitor, a control terminal coupled to a reset signal terminal, and a second terminal coupled to an initialization signal terminal.

In an exemplary embodiment of the present disclosure, the ultrasonic echo acquisition circuit further includes: a sixth switch and a seventh switch. The sixth switch has a first terminal coupled to the second electrode terminal of the capacitor, a control terminal coupled to the reset signal terminal, and a second terminal coupled to the initialization signal terminal; and the seventh switch has a first terminal coupled to the first node, a control terminal coupled to the reset signal terminal, and a second terminal coupled to the initialization signal terminal.

In an exemplary embodiment of the present disclosure, the first circuit or the second circuit includes: a first switch, a driving transistor, a second switch, a third switch, a fourth switch, and a capacitor. The first switch has a first terminal coupled to the first power signal terminal, and a control terminal coupled to the fourth node; the driving transistor has a first terminal coupled to a second terminal of the first switch; the second switch has a first terminal coupled to the first terminal of the driving transistor, a second terminal coupled to the first node, and a control terminal coupled to the second node; the third switch has a first terminal coupled to a second terminal of the driving transistor, a second terminal coupled to a control terminal of the driving transistor, and a control terminal coupled to the third node; the fourth switch has a first terminal coupled to the second terminal of the driving transistor, a second terminal coupled to the sixth node, and a control terminal coupled to the fifth node; and the capacitor has a first electrode terminal coupled to the first terminal of the first switch, and a second electrode terminal coupled to the control terminal of the driving transistor.

In an exemplary embodiment of the present disclosure, the light emitting circuit further includes: a fifth switch having a first terminal coupled to the second electrode terminal of the capacitor, a second terminal coupled to an initialization signal terminal, and a control terminal coupled to a reset signal terminal; and a sixth switch having a first terminal coupled to the initialization signal terminal, a control terminal coupled to the reset signal terminal, and a second terminal coupled to the second terminal of the fourth switch.

In an exemplary embodiment of the present disclosure, the ultrasonic echo acquisition circuit further includes: a seventh switch having a first terminal coupled to the second electrode terminal of the capacitor, a second terminal coupled to the initialization signal terminal, and a control terminal coupled to the reset signal terminal; and an eighth switch having a first terminal coupled to the initialization signal terminal, a control terminal coupled to the reset signal terminal, and a second terminal coupled to the second terminal of the second switch.

In an exemplary embodiment of the present disclosure, the first circuit has the same structure as the second circuit.

In an exemplary embodiment of the present disclosure, the display panel includes a display area, the display area including a plurality of sub-pixel units, and the same sub-pixel unit may include the ultrasonic echo acquisition circuit and the light emitting circuit.

In an exemplary embodiment of the present disclosure, the ultrasonic echo acquisition circuit and the light emitting circuit are arranged with a connection line between adjacent ultrasonic echo acquisition circuit and a connection line between adjacent light emitting circuit crossing each other.

In an exemplary embodiment of the present disclosure, the ultrasonic echo acquisition circuit and/or the light emitting circuit have a shape of any one of a diamond shape, a rectangle shape, a triangle shape, and a polygon shape.

The present disclosure also provides a driving method of a display panel, including: in a writing stage of a light emitting circuit, writing a scan signal simultaneously to an ultrasonic echo acquisition circuit and the light emitting circuit; and in a light emitting stage of the light emitting circuit, writing a control signal simultaneously to the ultrasonic echo acquisition circuit and the light emitting circuit.

In an exemplary embodiment of the present disclosure, the method further includes a reset stage before the writing stage of the light emitting circuit, and the method further includes: in the reset stage of the light emitting circuit, writing a reset signal simultaneously to the ultrasonic echo acquisition circuit and the light emitting circuit.

The present disclosure also provides a display device including the display panel described above.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure. It is apparent that the drawings in the following description are only some of the embodiments of the present disclosure, and other drawings may be obtained from those skilled in the art without creative efforts.

DETAILED DESCRIPTION

Figure 1:
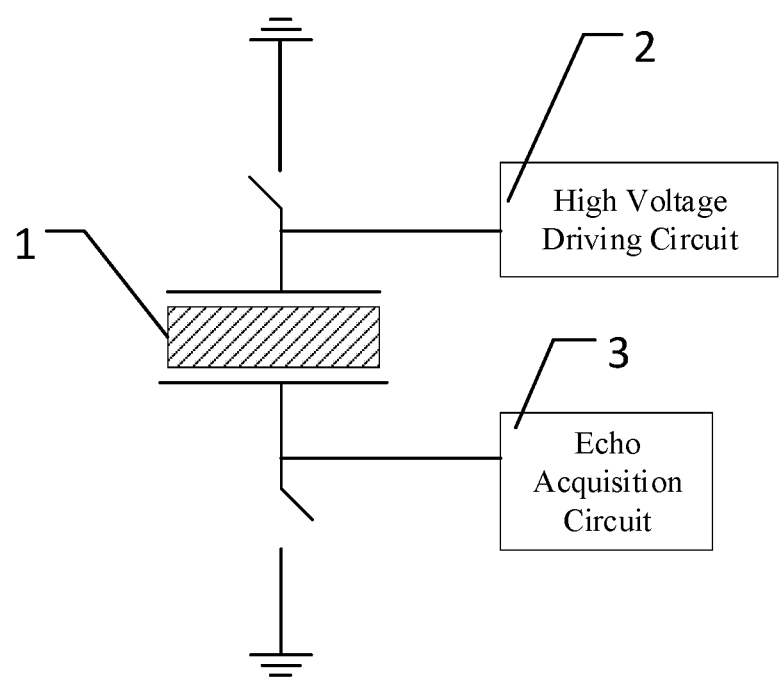
FIG. 1 is a schematic structural diagram of an ultrasonic fingerprint recognition structure in the related art.

Exemplary embodiments will now be described more fully with reference to the accompanying drawings. However, the exemplary embodiments can be embodied in a variety of forms and should not be construed as being limited to the embodiments set forth herein. Rather, these embodiments are provided to make the present disclosure more thorough and complete, and to fully convey the concept of the exemplary embodiments to those skilled in the art. In the figures, the same reference numerals in the drawings denote the same or similar structures, and thus their detailed description will be omitted.

Although the relative terms such as "on" and "below" are used in the specification to describe the relative relationship of one component to another component as illustrated, these terms are used in this specification for convenience only, for example, according to the exemplary direction illustrated in the accompanying drawings. It will be understood that if the device as illustrated is flipped upside down, the component described "on" will become the component described "below". Other relative terms such as "high", "low", "top", "bottom", "left" and "right" also have similar meanings. When a structure is "on" another structure, it may mean that a structure is integrally formed on other structure, or that a structure is "directly" disposed on other structure, or that a structure is "indirectly" disposed on other structure through another structure.

In the present specification, the terms "a", "an", and "the" are used to indicate that there are one or more elements/components/etc. The terms "comprising", "including", and "having" are used to indicate an open-ended inclusive meaning and are meant to indicate that there may be other elements/components, etc., in addition to the listed elements/components/etc.

As shown in FIG. 1, a schematic structural diagram of an ultrasonic fingerprint identification structure in the related art is illustrated. The current ultrasonic fingerprint recognition structure mainly includes an ultrasonic wave receiving sensor 1, a high voltage driving circuit 2, and an echo acquisition circuit 3.

In the related art, the ultrasonic fingerprint identification structure is an external module of the display panel, wherein the echo acquisition circuit 3 in the ultrasonic fingerprint identification structure includes an independent sequential logic circuit.

However, the independently arranged sequential logic circuit in the echo acquisition circuit 3 not only increases the power consumption caused by fingerprint recognition, but also increases the overall thickness of the display device.

Figure 2:
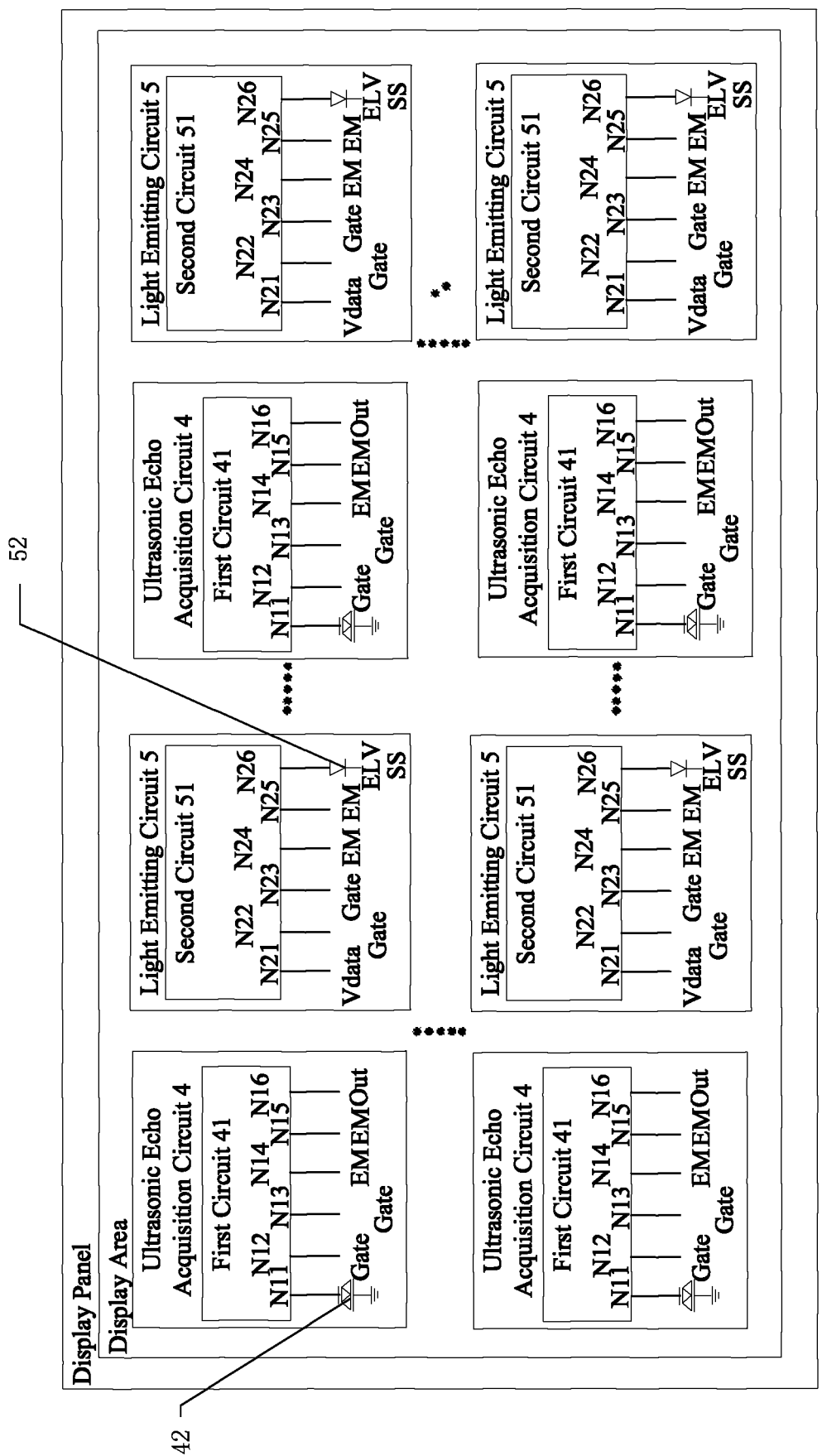
FIG. 2 is a schematic structural diagram of an exemplary embodiment of a display panel of the present disclosure.

An exemplary embodiment of the present embodiment first provides a display panel, as shown in FIG. 2, where a schematic structural diagram of an exemplary embodiment of the display panel of the present disclosure is illustrated. The display panel may include an ultrasonic echo acquisition circuit 4 and a light emitting circuit 5. The ultrasonic echo acquisition circuit 4 may include a first circuit 41 and an ultrasonic wave receiving sensor 42. The first circuit 41 has a first node N11 coupled to a first electrode terminal of the ultrasonic wave receiving sensor 42, a second node N12 and a third node N13 coupled to a scan signal terminal to receive a scan signal Gate, a fourth node N14 and a fifth node N15 coupled to a control signal terminal to receive a control signal EM, and a sixth node N16 coupled to an output terminal Out of the ultrasonic echo acquisition circuit 4. The light emitting circuit 5 may include a second circuit 51 and a light emitting diode 52. The second circuit 51 has a first node N21 coupled to a data signal terminal to receive a data signal Vdata, a second node N22, and a third node N23 coupled to the scan signal terminal to receive the scan signal Gate, a fourth node N24 and a fifth node N25 coupled to the control signal terminal to receive the control signal EM, and a sixth node N26 coupled to an input terminal of the light emitting diode 52.

An exemplary embodiment provides a display panel and a driving method, and a display device. The display panel includes an ultrasonic echo acquisition circuit and a light emitting circuit. The ultrasonic echo acquisition circuit and the light emitting circuit share the same timing logic. On one hand, this arrangement can avoid configuring the timing logic for the acquisition circuit, thereby reducing the thickness of the display panel. On the other hand, this arrangement can reduce the power consumption caused by fingerprint recognition.

It should be noted that the structures of the first circuit 41 and the second circuit 51 may be the same or different.

Figure 3:
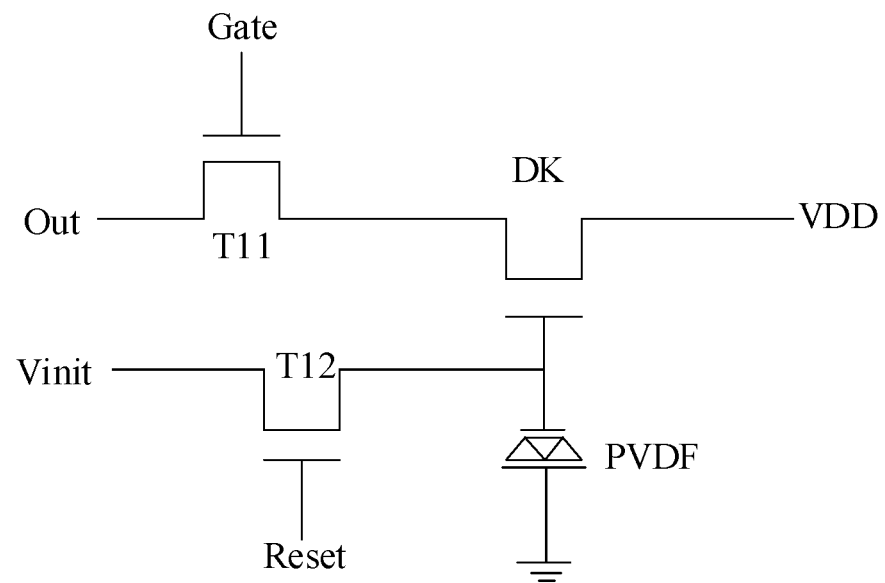
FIG. 3 is a circuit diagram of an ultrasonic echo acquisition circuit in the related art.

FIG. 3 shows a circuit diagram of an ultrasonic echo acquisition circuit in the related art. In FIG. 3, the ultrasonic echo acquisition circuit mainly includes two stages: a reset stage and a writing stage. In the reset stage, a control terminal of a switch T12 is turned on by a reset signal Reset, and a control terminal of a driving transistor DK is reset by an initialization signal Vinit. In the writing stage, the scan signal Gate acts on a control terminal of a switch T11 to turn on the switch T11, a power signal VDD acts on a source electrode of the driving transistor DK, and an electrical signal generated by the ultrasonic receive sensor PVDF (Polyvinylidene fluoride, a vinylidene fluoride homopolymer or a copolymer of vinylidene fluoride and other small amount of fluorine-containing vinyl monomer) acts on a gate electrode of the driving transistor DK, thereby outputting a signal to the output terminal Out through the switch T11. However, this circuit has a problem that the threshold voltage of the driving transistor DK cannot be compensated.

Figure 4:
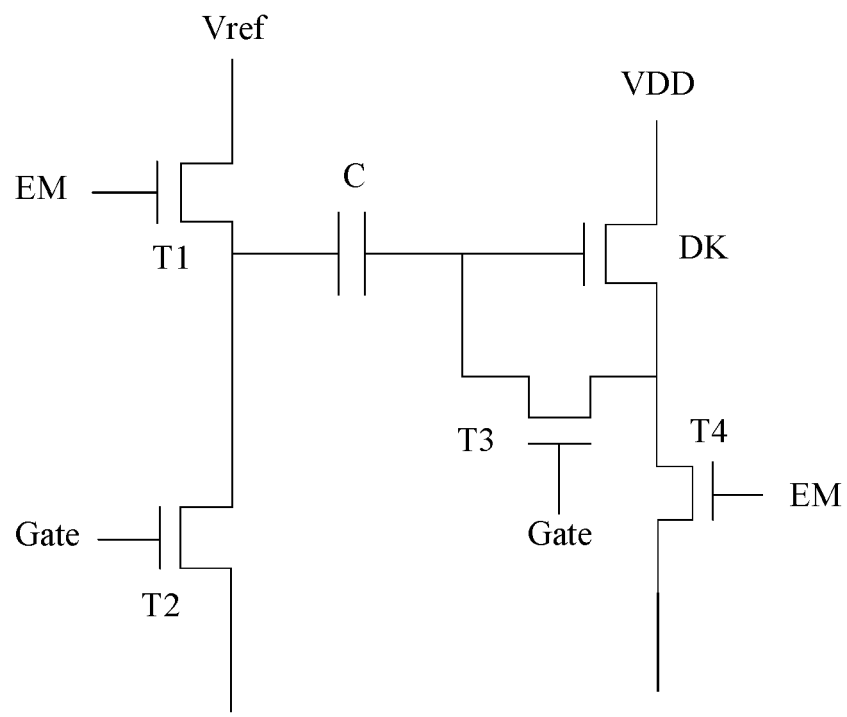
FIG. 4 is a schematic structural diagram of a first circuit or a second circuit in an exemplary embodiment of a display panel of the present disclosure.

In view of this, in an exemplary embodiment of the present disclosure, as shown in FIG. 4, a schematic structural diagram of a first circuit or a second circuit in an exemplary embodiment of the display panel of the present disclosure is illustrated. The first circuit or the second circuit may include a first switch T1, a second switch T2, a capacitor C, a driving transistor DK, a third switch T3, and a fourth switch T4. The first switch T1 has a first terminal for receiving a reference voltage signal Vref and a control terminal coupled to the fourth node N14 or N24. The second switch T2 has a first terminal coupled to the second terminal of the first switch T1, a control terminal coupled to the second node N12 or N22, and a second terminal coupled to the first node N11 or N21. The capacitor C has a first electrode terminal coupled to the second terminal of the first switch T1. The driving transistor DK has a first terminal coupled to a first power signal terminal VDD, and the driving transistor DK has a control terminal coupled to a second electrode terminal of the capacitor C. The third switch T3 has a first terminal coupled to the second electrode terminal of the capacitor C, a control terminal coupled to the third node N13 or N23, and a second terminal coupled to a second terminal of the driving transistor DK. The fourth switch T4 has a first terminal coupled to the second terminal of the third switch T3, a control terminal coupled to a fifth node N15 or N25, and a second terminal coupled to the sixth node N16 or N26. The switches and the driving transistors may be N-type transistors or P-type transistors. An exemplary embodiment of the present embodiment will be described by taking each switch and driving transistor being a P-type transistor as example.

Figure 5:
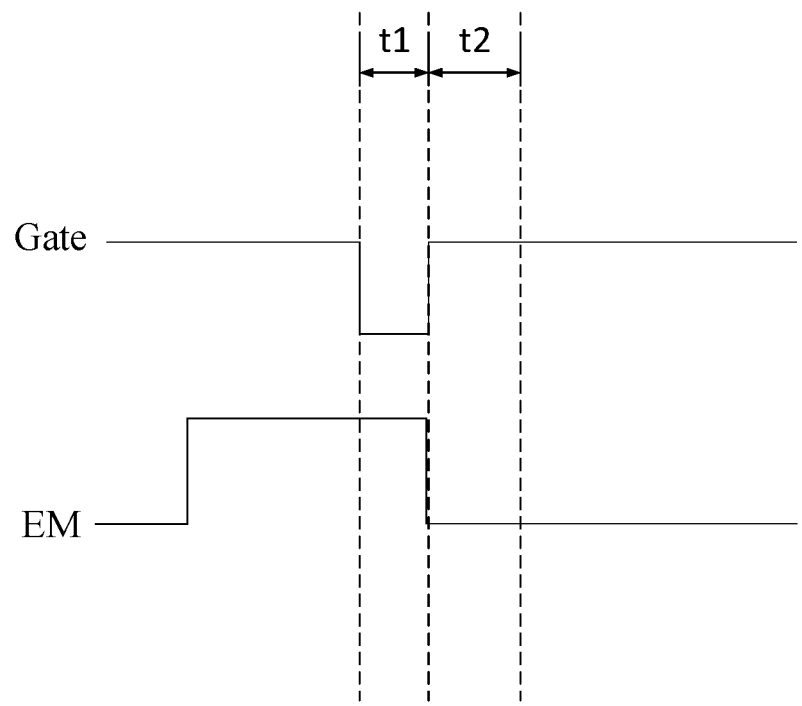
FIG. 5 is a timing diagram of an ultrasonic echo acquisition circuit in an exemplary embodiment of the display panel of the present disclosure.

In an exemplary embodiment of the present embodiment, the ultrasonic echo acquisition circuit may be composed of the first circuit described above and the ultrasonic wave receiving sensor. FIG. 5 is a timing diagram of an ultrasonic echo acquisition circuit in an exemplary embodiment of the display panel of the present disclosure. The ultrasonic echo acquisition circuit can include a writing stage and a compensation stage. In the writing stage (t1): the scan signal Gate is at a low level; the switches T2 and T3 are turned on; the ultrasonic wave receiving sensor writes a signal V1 to the first electrode terminal of the capacitor C, and at the same time, a first power signal terminal VDD writes a signal VDD+Vth (Vth is the threshold voltage of the driving transistor DK) to the second electrode terminal of the capacitor C. In the compensation stage (t2): the control signal EM is at a low level; switches T1 and T4 are turned on; voltage of the first electrode terminal of the capacitor C jumps to Vref, and a voltage of the second electrode terminal of the capacitor C jumps to VDD+Vth+Vref−V1.

On this basis, according to a calculation equation of a driving current of the driving transistor DK:

$$I = K \times (Vgs - Vth)^2 = K \times (Vg - Vs - Vth)^2$$
$$= k \times (VDD + Vth + Vref - V1 - VDD - Vth)^2$$
$$= k \times (Vref - V1)^2$$

where Vgs is a voltage difference between a gate electrode and a source electrode of a driving transistor DK, Vg is a gate voltage of a driving transistor DK, and Vs is a source voltage of a driving transistor DK.

In the ultrasonic echo acquisition circuit composed of the first circuit described above, the driving current I of the driving transistor DK is independent of Vth and VDD, thereby realizing compensation of Vth and VDD.

The light emitting circuit composed of the above second circuit has the same working principle as the ultrasonic echo acquisition circuit, and the light emitting circuit can also realize compensation of Vth and VDD. The light emitting circuit may include: a writing stage and a light emitting stage. The writing stage of the light emitting circuit corresponds to the writing stage of the ultrasonic echo acquisition circuit, and the light emitting stage of the light emitting circuit corresponds to the compensation stage of the ultrasonic echo acquisition circuit.

Figure 6:
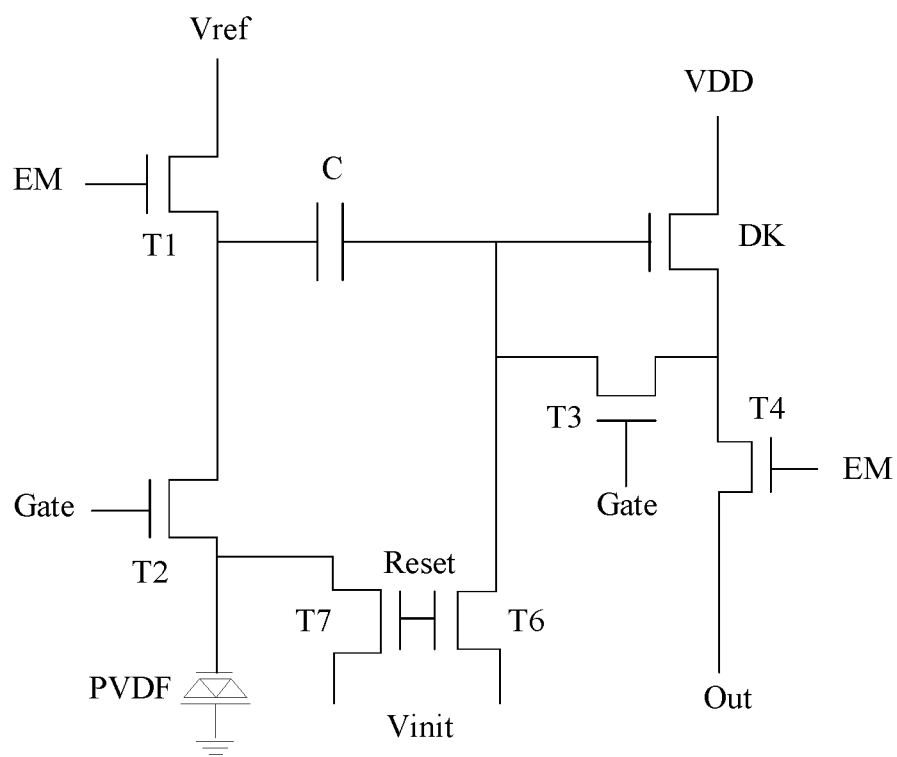
FIG. 6 is a structural diagram of an ultrasonic echo acquisition circuit in an exemplary embodiment of a display panel of the present disclosure.

In the compensation stage of the first circuit described above, the charges in the capacitor C, if not completely consumed, may affect the amount of power on both sides of the capacitor C in the next writing stage. Therefore, in an exemplary embodiment of the present embodiment, as shown in FIG. 6, a structural diagram of an ultrasonic echo acquisition circuit in an exemplary embodiment of the display panel of the present disclosure is illustrated. The ultrasonic echo acquisition circuit may further include: a sixth switch T6 and a seventh switch T7. The sixth switch T6 has a first terminal coupled to the second electrode terminal of the capacitor C, a control terminal coupled to the reset signal terminal to receive a reset signal Reset, and a second terminal coupled to the initialization signal terminal Vinit to receive the initialization signal Vinit. The seventh switch T7 has a first terminal coupled to the first node N11, a control terminal coupled to the reset signal terminal to receive a reset signal Reset, and a second terminal coupled to the initialization signal terminal to receive the initialization signal Vinit.

Figure 7:
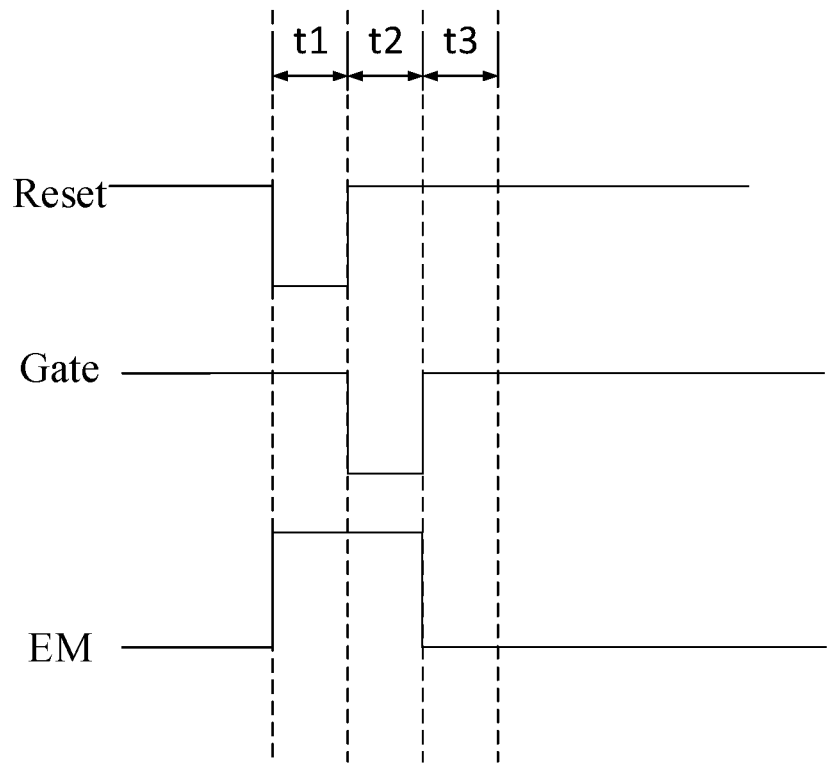
FIG. 7 is a timing diagram of an ultrasonic echo acquisition circuit in an exemplary embodiment of the display panel of the present disclosure.

In an exemplary embodiment of the present embodiment, as shown in FIG. 7, a timing chart of an ultrasonic echo acquisition circuit in an exemplary embodiment of the display panel of the present disclosure is illustrated. The ultrasonic echo acquisition circuit may include a reset stage (t1), a writing stage (t2), and a compensation stage (t3). In the reset stage: the reset signal is at a low level; the switches T6 and T7 are turned on; and the first node N11 of the first circuit and the second electrode terminal of the capacitor C are reset by the initialization signal Vinit. The writing stage (t2) and the compensation stage (t3) operate in the same manner as the writing stage (t2) and the compensation stage (t3) of the ultrasonic echo acquisition circuit described above. In the exemplary embodiment of the present embodiment, through the reset stage, it can avoid the influence of the charges remaining in the capacitor C in the previous compensation stage on the next writing stage.

Figure 8:
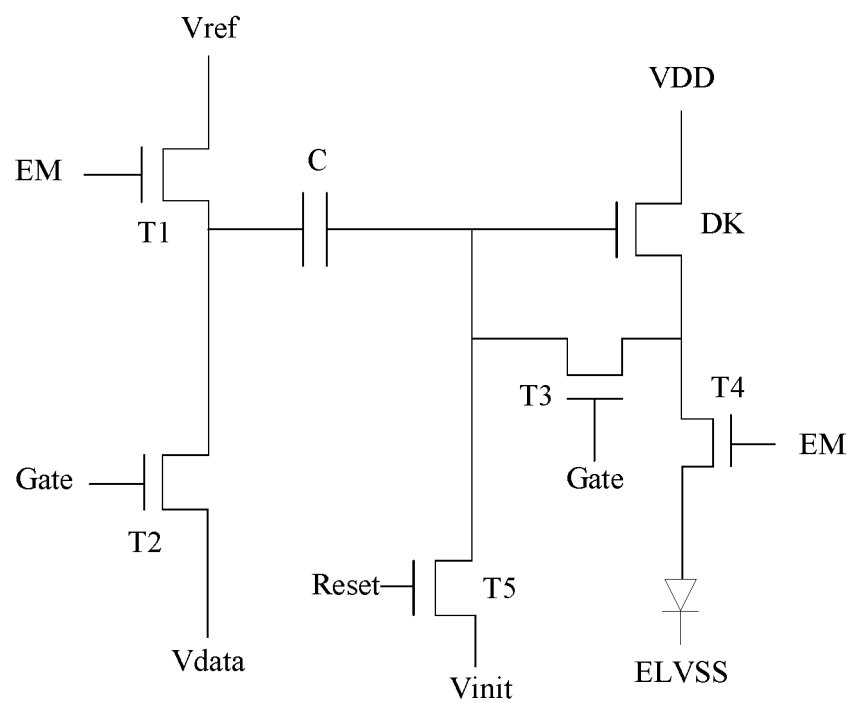
FIG. 8 is a structural diagram of a light emitting circuit in an embodiment of the display panel of the present disclosure.

Correspondingly, the influence of the charges remaining in the capacitor C in the previous light emitting stage on the next writing stage is also present in the light emitting circuit. In an exemplary embodiment of the present disclosure, as shown in FIG. 8, a structural diagram of a light emitting circuit in an embodiment of the display panel of the present disclosure is illustrated. The light emitting circuit may further include: a fifth switch T5. The fifth switch T5 has a first terminal coupled to the second electrode terminal of the capacitor C, a control terminal coupled to the reset signal terminal to receive the reset signal Reset, and a second terminal coupled to the initialization signal terminal to receive the initialization signal Vinit.

Figure 9:
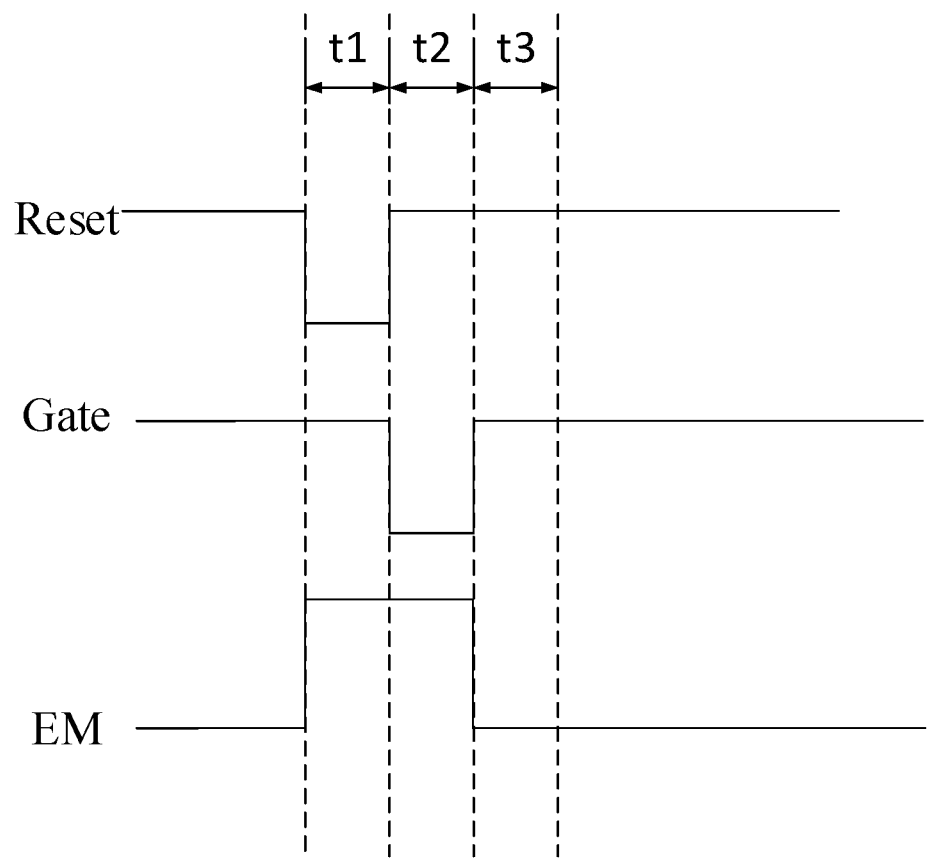
FIG. 9 is a timing diagram of a light emitting circuit in an exemplary embodiment of a display panel of the present disclosure.

In an exemplary embodiment of the present embodiment, as shown in FIG. 9, a timing diagram of a light emitting circuit in an exemplary embodiment of the display panel of the present disclosure is illustrated. The light emitting circuit may include a reset stage (t1), a writing stage (t2), and a light emitting stage (t3). In the reset stage (t1): the reset signal Reset is at a low level; the fifth switch T5 is turned on; and the second electrode terminal of the capacitor C is reset by the initialization signal Vinit. The writing stage (t2) and the light emitting stage (t3) are the same as the writing stage (t2) and the light emitting stage (t3) of the above described light emitting circuit. In the exemplary embodiment of the present embodiment, through the reset stage, it can avoid the influence of the charges remaining in the capacitor C in the previous light emitting stage on the next writing stage.

Figure 10:
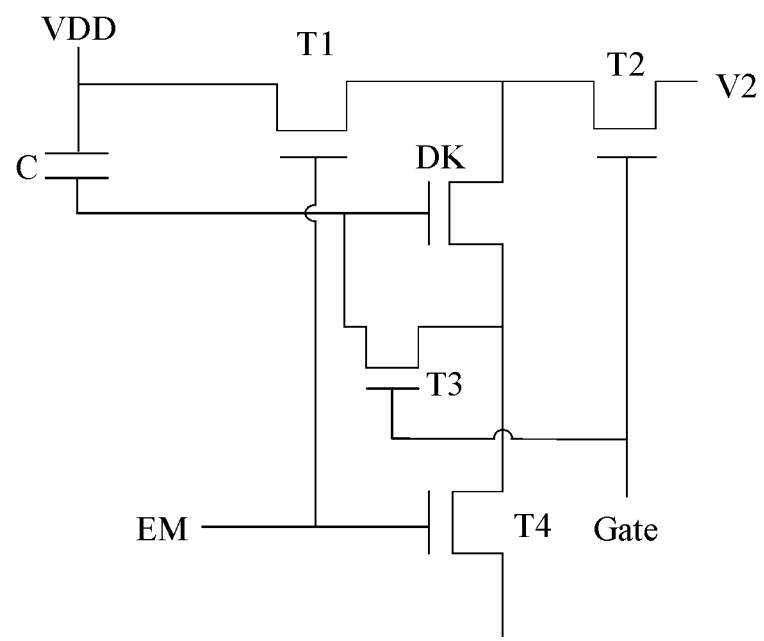
FIG. 10 is another structural diagram of a first circuit or a second circuit in an exemplary embodiment of the display panel of the present disclosure.

In other exemplary embodiments, the first circuit or the second circuit has more options to choose from, for example, as shown in FIG. 10, another structural diagram of the first circuit or the second circuit in an exemplary embodiment of the display panel of the present disclosure is illustrated. The first circuit or the second circuit may include a first switch T1, a driving transistor DK, a second switch T2, a third switch T3, a fourth switch T4, and a capacitor C. The first switch T1 has a first terminal coupled to the first power signal terminal VDD, and a control terminal coupled to the fourth node N14 or N24. The driving transistor DK has a first terminal coupled to a second terminal of the first switch T1. The second switch T2 has a first terminal coupled to a first terminal of the driving transistor DK, a second terminal coupled to the first node N11 or N21, and a control terminal coupled to the second node N12 or N22. The third switch T3 has a first terminal coupled to the second terminal of the driving transistor DK, and a second terminal coupled to a control terminal of the driving transistor DK, and a control terminal coupled to the third node N13 or N23. The fourth switch T4 has a first terminal coupled to a second terminal of the driving transistor DK, a second terminal coupled to the sixth node N16 or N26, and a control terminal coupled to the fifth node N15 or N25. The capacitor C has a first electrode terminal coupled to the first terminal of the first switch T1, and a second electrode terminal coupled to the control terminal of the driving transistor DK.

It should be noted that structures of the first circuit and the second circuit used in the ultrasonic echo acquisition circuit and the light emitting circuit may be different. For example, the ultrasonic echo acquisition circuit adopts the circuit structure in FIG. 4, and the light emitting circuit may adopt the circuit structure in FIG. 10.

As shown in FIG. 10, the ultrasonic echo acquisition circuit and the light emitting circuit composed of the above circuits also have a same threshold compensation function, and an ultrasonic echo acquisition circuit will be described below as an example. The above circuit includes a writing stage and a compensation stage. In the writing stage, the scan signal Gate outputs a low level voltage; the second switch T2 and the third switch T3 are turned on; and the second terminal of the second switch T2 receives the signal V2 input by the ultrasonic wave receiving sensor PVDF, thereby generating a voltage V2+Vth at the control terminal of the driving transistor DK. In the compensation stage: the control signal EM outputs a low level voltage; the switches T4 and T1 are turned on; and the first power signal terminal VDD inputs a voltage VDD to the first terminal of the driving transistor DK.

On this basis, according to a calculation equation of a driving current of the driving transistor DK:

$$I = K \times (Vgs - Vth)^2 = K \times (Vg - Vs - Vth)^2$$
$$= k \times (V2 + Vth - VDD - Vth)^2$$
$$= k \times (V2 - VDD)^2$$

where, Vgs is a voltage difference between a gate electrode and a source electrode of a driving transistor DK, Vg is a gate voltage of a driving transistor DK, and Vs is a source voltage of a driving transistor DK.

In the ultrasonic echo acquisition circuit composed of the above first circuit, the driving current of the driving transistor DK is independent of Vth, thereby realizing the compensation of Vth.

The light emitting circuit composed of the above second circuit has the same working principle as the ultrasonic echo acquisition circuit, and the light emitting circuit can also realize the compensation of Vth. The light emitting circuit includes: a writing stage and an emitting stage. The writing stage of the light emitting circuit corresponds to the writing stage of the ultrasonic echo acquisition circuit, and the light emitting stage of the light emitting circuit corresponds to the compensation stage of the ultrasonic echo acquisition circuit.

Figure 11:
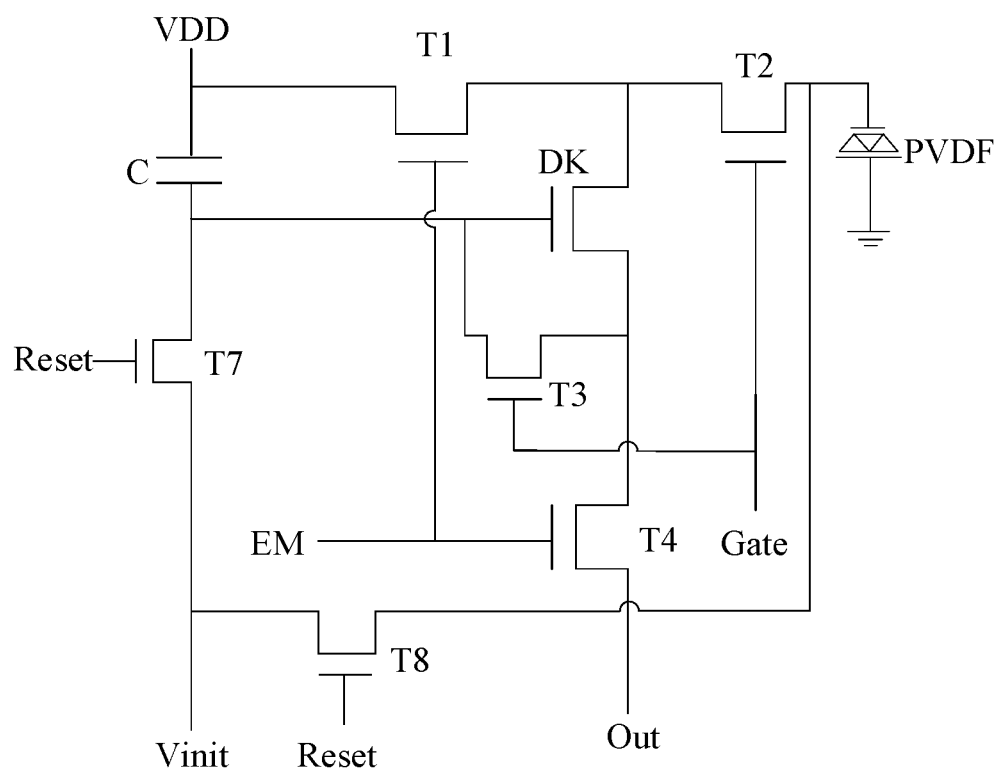
FIG. 11 is a structural diagram of an ultrasonic echo acquisition circuit in an exemplary embodiment of a display panel of the present disclosure.

In the compensation stage of the first circuit described above, if the charges in the capacitor C are not completely consumed, they may affect the amount of power on both sides of the capacitor C in the next writing stage. Therefore, in an exemplary embodiment of the present embodiment, as shown in FIG. 11, a structural diagram of an ultrasonic echo acquisition circuit in an exemplary embodiment of the display panel of the present disclosure illustrated. The ultrasonic echo acquisition circuit further includes a seventh switch T7 and an eighth switch T8. The seventh switch T7 has a first terminal coupled to the second electrode terminal of the capacitor C, a second terminal coupled to the initialization signal terminal to receive the initialization signal Vinit, and a control terminal coupled to the reset signal terminal to receive the reset signal Reset. The eighth switch T8 has a first terminal coupled to the initialization signal terminal to receive the initialization signal Vinit, a control terminal coupled to the reset signal terminal to receive the reset signal Reset, and a second terminal coupled to the second terminal of the second switch T2. The ultrasonic echo acquisition circuit includes a reset stage, a writing stage, and a compensation stage. In the reset stage: the reset signal Reset outputs a low level voltage; the seventh switch T7 and the eighth switch T8 are turned on; and the initialization signal Vinit resets the second terminal of the second switch T2 and the second electrode terminal of the capacitor C.

Figure 12:
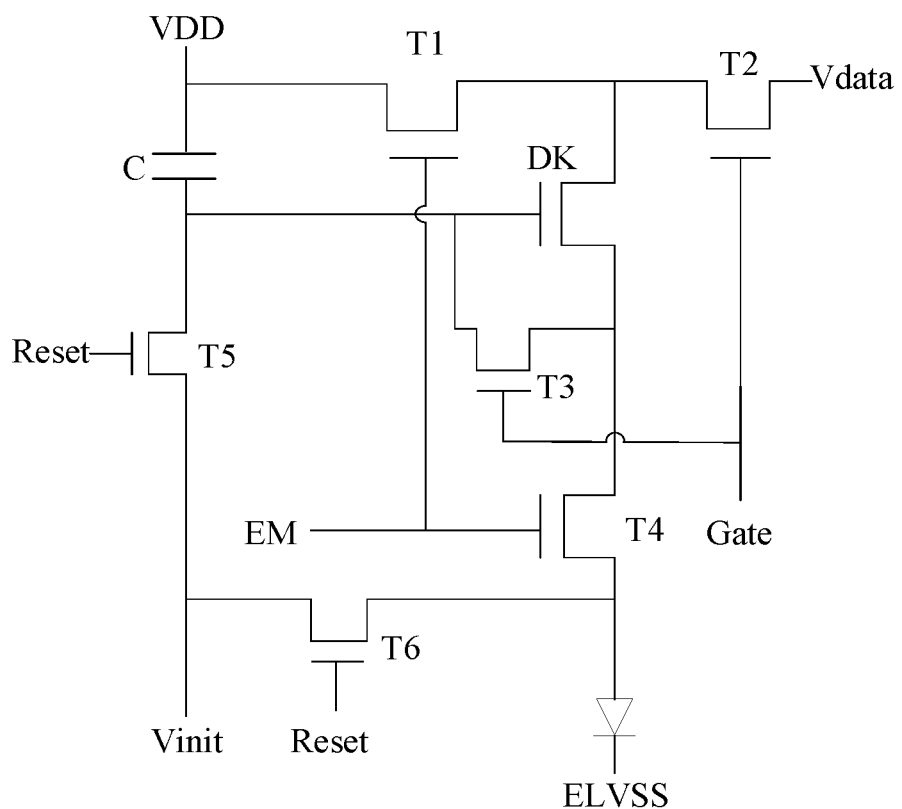
FIG. 12 is a structural diagram of a light emitting circuit in an exemplary embodiment of a display panel of the present disclosure.

As shown in FIG. 12, a structural diagram of a light emitting circuit in an exemplary embodiment of a display panel of the present disclosure is illustrated. The light emitting circuit further includes: a fifth switch T5 and a sixth switch T6. The fifth switch T5 has a first terminal coupled to the second electrode terminal of the capacitor C, a second terminal coupled to the initialization signal terminal to receive an initialization signal Vinit, and a control terminal coupled to the reset signal terminal to receive the reset signal Reset. The sixth switch T6 has a first terminal coupled to the initialization signal terminal to receive the initialization signal Vinit, a control terminal coupled to the reset signal terminal to receive the reset signal Reset, and a second terminal coupled to the second terminal of the fourth switch T4. The above light emitting circuit includes a reset stage, a writing stage and a compensation stage. In the reset stage: the reset signal Reset outputs a low level voltage; the fifth switch T5 and the sixth switch T8 are turned on; and the initialization signal Vinit can reset the second electrode terminal of the capacitor C and the input terminal of the light emitting diode LED.

Figures 13, 14:
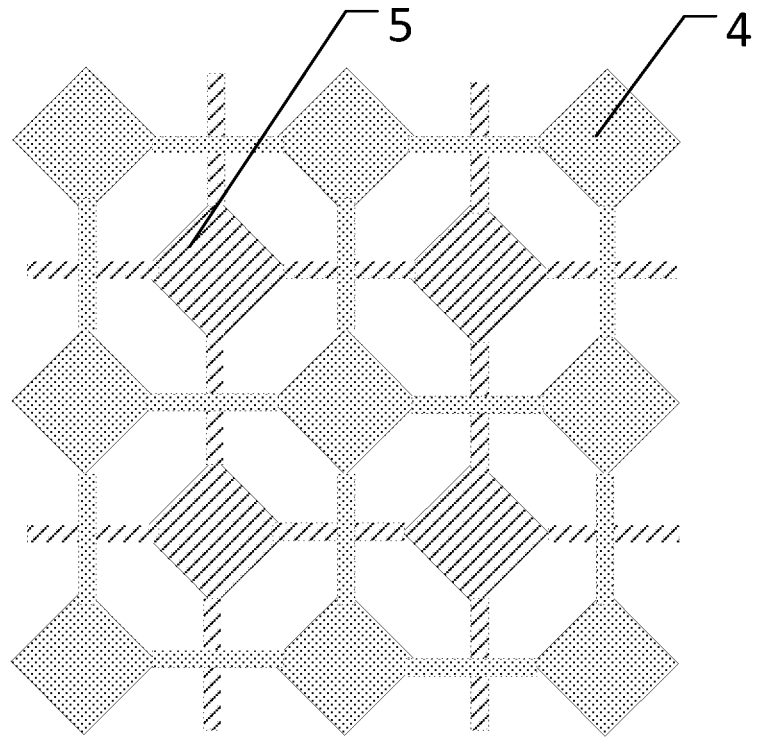
FIG. 13 is a distribution diagram of an ultrasonic echo acquisition circuit and a light emitting circuit in an exemplary embodiment of the present disclosure.
FIG. 14 is a flowchart of a driving method of a display panel in an exemplary embodiment of the present disclosure.

In an exemplary embodiment of the present embodiment, as shown in FIG. 13, a distribution diagram of an ultrasonic echo acquisition circuit and a light emitting circuit in an exemplary embodiment of the present disclosure is illustrated. The display panel includes a display area, the display area including a pixel circuit, the pixel circuit including a plurality of sub-pixel units, and the same sub-pixel unit may include the ultrasonic echo acquisition circuit 4 and the light emitting circuit 5. The ultrasonic echo acquisition circuit 4 and the light emitting circuit 5 may be arranged with a connection line between adjacent ultrasonic echo acquisition circuit and a connection line between adjacent light emitting circuit crossing each other. The ultrasonic echo acquisition circuit 4 and the light emitting circuit 5 can be integrated in the same sub-pixel unit by printing and etching, thereby eliminating the need to separately producing the ultrasonic echo acquisition circuit and further reducing the thickness of the display panel. In an exemplary embodiment of the present embodiment, the shape of the ultrasonic echo acquisition circuit 4 and/or the light emitting circuit 5 may be a diamond shape. The aperture ratio and transmittance of the sub-pixel unit can be adjusted by setting the shape of the ultrasonic echo acquisition circuit 4 and/or the light emitting circuit 5. In other embodiments, the shape of the ultrasonic echo acquisition circuit 4 and/or the light emitting circuit 5 may also be other shapes, such as a rectangle, a triangle, a polygon, etc., which all fall within the protection scope of the present disclosure.

An exemplary embodiment of the present embodiment further provides a driving method of a display panel, and as shown in FIG. 14, a flowchart of an exemplary embodiment of a driving method of the display panel of the present disclosure is illustrated. The driving method of the display panel includes the following steps:

in step S1, in the writing stage of the light emitting circuit, a scan signal is written to the ultrasonic echo acquisition circuit and the light emitting circuit simultaneously;

in step S2, in the light emitting stage of the light emitting circuit, the ultrasonic echo acquisition circuit and the light emitting circuit simultaneously write a control signal.

In an exemplary embodiment of the present disclosure, before the writing stage of the light emitting circuit, the method further includes a reset stage and in the reset stage of the light emitting circuit, a reset signal is written into the ultrasonic echo acquisition circuit and the light emitting circuit simultaneously.

The driving method of the display panel has the same technical features and working principles as the above display panel, and the above content has been described in detail, which will not be repeated herein.

An exemplary embodiment of the present embodiment further provides a display device including the display panel described in any of the above embodiments.

The display device has the same technical features and working principles as the above display panel, and the above content has been described in detail, which will not be repeated herein.

The present disclosure provides a display panel and a driving method thereof, and a display device. The display panel includes an ultrasonic echo acquisition circuit and a light emitting circuit. The ultrasonic echo acquisition circuit and the light emitting circuit share the same timing logic. On one hand, this arrangement can avoid configuring the timing logic for the acquisition circuit, thereby reducing the thickness of the display panel. On the other hand, this arrangement can reduce the power consumption caused by fingerprint recognition.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

The features, structures, or characteristics described above may be combined in any suitable manner in one or more embodiments, and the features discussed in the various embodiments are interchangeable, if possible. In the description above, numerous specific details are set forth to provide a thorough understanding of the embodiments of the present disclosure. However, it will be appreciated by those skilled in the art that the technical solutions of the present disclosure may be practiced without one or more of the specific details, or other methods, components, materials, etc. may be employed. In other instances, well-known structures, materials or operations are not shown or described in detail to avoid obscuring aspects of the present disclosure.

What is claimed is:

1. A display panel, comprising:
    an ultrasonic echo acquisition circuit comprising a first circuit and an ultrasonic wave receiving sensor, wherein the first circuit has a first node coupled to a first electrode terminal of the ultrasonic wave receiving sensor, a second node and a third node coupled to a scan signal terminal, a fourth node and a fifth node coupled to a control signal terminal, and a sixth node being an output terminal of the ultrasonic echo acquisition circuit; and
    a light emitting circuit comprising a second circuit and a light emitting diode, wherein the second circuit has a first node coupled to a data signal terminal, a second node and a third node coupled to the scan signal terminal coupled to the ultrasonic echo acquisition circuit, a fourth node and a fifth node coupled to the control signal terminal coupled to the ultrasonic echo acquisition circuit, and a sixth node coupled to an input terminal of the light emitting diode.

2. The display panel according to claim 1, wherein the first circuit or the second circuit comprises:
    a first switch having a first terminal for receiving a reference voltage signal, and a control terminal coupled to the fourth node;
    a second switch having a first terminal coupled to a second terminal of the first switch, a control terminal coupled to the second node, and a second terminal coupled to the first node;
    a capacitor having a first electrode terminal coupled to the second terminal of the first switch;
    a driving transistor having a first terminal coupled to a first power signal terminal, and a control terminal coupled to a second electrode terminal of the capacitor;
    a third switch having a first terminal coupled to the second electrode terminal of the capacitor, a control terminal coupled to the third node, and a second terminal coupled to a second terminal of the driving transistor; and
    a fourth switch having a first terminal coupled to the second terminal of the third switch, a control terminal coupled to the fifth node, and a second terminal coupled to the sixth node.

3. The display panel of claim 2, wherein the light emitting circuit further comprises:
    a fifth switch having a first terminal coupled to the second electrode terminal of the capacitor, a control terminal coupled to a reset signal terminal, and a second terminal coupled to an initialization signal terminal.

4. The display panel according to claim 3, wherein the ultrasonic echo acquisition circuit further comprises:
    a sixth switch having a first terminal coupled to the second electrode terminal of the capacitor, a control terminal coupled to the reset signal terminal, and a second terminal coupled to the initialization signal terminal; and
    a seventh switch having a first terminal coupled to the first node, a control terminal coupled to the reset signal terminal, and a second terminal coupled to the initialization signal terminal.

5. The display panel according to claim 1, wherein the first circuit or the second circuit comprises:
    a first switch having a first terminal coupled to the first power signal terminal, and a control terminal coupled to the fourth node;
    a driving transistor having a first terminal coupled to a second terminal of the first switch;
    a second switch having a first terminal coupled to the first terminal of the driving transistor, a second terminal coupled to the first node, and a control terminal coupled to the second node;
    a third switch having a first terminal coupled to a second terminal of the driving transistor, a second terminal coupled to a control terminal of the driving transistor, and a control terminal coupled to the third node;
    a fourth switch having a first terminal coupled to the second terminal of the driving transistor, a second terminal coupled to the sixth node, and a control terminal coupled to the fifth node; and
    a capacitor having a first electrode terminal coupled to the first terminal of the first switch, and a second electrode terminal coupled to the control terminal of the driving transistor.

6. The display panel according to claim 5, wherein the light emitting circuit further comprises:
    a fifth switch having a first terminal coupled to the second electrode terminal of the capacitor, a second terminal coupled to an initialization signal terminal, and a control terminal coupled to a reset signal terminal; and
    a sixth switch having a first terminal coupled to the initialization signal terminal, a control terminal coupled to the reset signal terminal, and a second terminal coupled to the second terminal of the fourth switch.

7. The display panel according to claim 6, wherein the ultrasonic echo acquisition circuit further comprises:
    a seventh switch having a first terminal coupled to the second electrode terminal of the capacitor, a second terminal coupled to the initialization signal terminal, and a control terminal coupled to the reset signal terminal; and
    an eighth switch having a first terminal coupled to the initialization signal terminal, a control terminal coupled to the reset signal terminal, and a second terminal coupled to the second terminal of the second switch.

8. The display panel according to claim 1, wherein the first circuit has same structure as the second circuit.

9. The display panel according to claim 1, wherein the display panel comprises a display area, the display area comprising a plurality of sub-pixel units, and the same sub-pixel unit may include the ultrasonic echo acquisition circuit and the light emitting circuit.

10. The display panel according to claim 1, wherein the ultrasonic echo acquisition circuit and the light emitting circuit are arranged with a connection line between adjacent ultrasonic echo acquisition circuit and a connection line between adjacent light emitting circuit crossing each other.

11. The display panel according to claim 1, wherein the ultrasonic echo acquisition circuit and/or the light emitting circuit have a shape of any one of a diamond shape, a rectangle shape, a triangle shape, and a polygon shape.

12. A driving method of a display panel, comprising:
providing an ultrasonic echo acquisition circuit comprising a first circuit and an ultrasonic wave receiving sensor, wherein the first circuit has a first node coupled to a first electrode terminal of the ultrasonic wave receiving sensor, a second node and a third node coupled to a scan signal terminal, a fourth node and a fifth node coupled to a control signal terminal, and a sixth node being an output terminal of the ultrasonic echo acquisition circuit;
providing a light emitting circuit comprising a second circuit and a light emitting diode, wherein the second circuit has a first node coupled to a data signal terminal, a second node and a third node coupled to the scan signal terminal coupled to the ultrasonic echo acquisition circuit, a fourth node and a fifth node coupled to the control signal terminal coupled to the ultrasonic echo acquisition circuit, and a sixth node coupled to an input terminal of the light emitting diode;
in a writing stage of the light emitting circuit, writing a scan signal simultaneously to the ultrasonic echo acquisition circuit and the light emitting circuit; and
in a light emitting stage of the light emitting circuit, writing a control signal simultaneously to the ultrasonic echo acquisition circuit and the light emitting circuit.

13. The driving method of the display panel according to claim 12, wherein the method further comprises a reset stage before the writing stage of the light emitting circuit, and the method further comprises:
in the reset stage of the light emitting circuit, writing a reset signal simultaneously to the ultrasonic echo acquisition circuit and the light emitting circuit.

14. A display device, comprising:
a display panel comprising:
an ultrasonic echo acquisition circuit comprising a first circuit and an ultrasonic wave receiving sensor, wherein the first circuit has a first node coupled to a first electrode terminal of the ultrasonic wave receiving sensor, a second node and a third node coupled to a scan signal terminal, a fourth node and a fifth node coupled to a control signal terminal, and a sixth node being an output terminal of the ultrasonic echo acquisition circuit; and
a light emitting circuit comprising a second circuit and a light emitting diode, wherein the second circuit has a first node coupled to a data signal terminal, a second node and a third node coupled to the scan signal terminal coupled to the ultrasonic echo acquisition circuit, a fourth node and a fifth node coupled to the control signal terminal coupled to the ultrasonic echo acquisition circuit, and a sixth node coupled to an input terminal of the light emitting diode.

15. The display device according to claim 14, wherein the first circuit or the second circuit comprises:
a first switch having a first terminal for receiving a reference voltage signal, and a control terminal coupled to the fourth node;
a second switch having a first terminal coupled to a second terminal of the first switch, a control terminal coupled to the second node, and a second terminal coupled to the first node;
a capacitor having a first electrode terminal coupled to the second terminal of the first switch;
a driving transistor having a first terminal coupled to a first power signal terminal, and a control terminal coupled to a second electrode terminal of the capacitor;
a third switch having a first terminal coupled to the second electrode terminal of the capacitor, a control terminal coupled to the third node, and a second terminal coupled to a second terminal of the driving transistor; and
a fourth switch having a first terminal coupled to the second terminal of the third switch, a control terminal coupled to the fifth node, and a second terminal coupled to the sixth node.

16. The display device according to claim 15, wherein the light emitting circuit further comprises:
a fifth switch having a first terminal coupled to the second electrode terminal of the capacitor, a control terminal coupled to a reset signal terminal, and a second terminal coupled to an initialization signal terminal.

17. The display device according to claim 16, wherein the ultrasonic echo acquisition circuit further comprises:
a sixth switch having a first terminal coupled to the second electrode terminal of the capacitor, a control terminal coupled to the reset signal terminal, and a second terminal coupled to the initialization signal terminal; and
a seventh switch having a first terminal coupled to the first node, a control terminal coupled to the reset signal terminal, and a second terminal coupled to the initialization signal terminal.

18. The display device according to claim 14, wherein the first circuit or the second circuit comprises:
a first switch having a first terminal coupled to the first power signal terminal, and a control terminal coupled to the fourth node;
a driving transistor having a first terminal coupled to a second terminal of the first switch;
a second switch having a first terminal coupled to the first terminal of the driving transistor, a second terminal coupled to the first node, and a control terminal coupled to the second node;
a third switch having a first terminal coupled to a second terminal of the driving transistor, a second terminal coupled to a control terminal of the driving transistor, and a control terminal coupled to the third node;
a fourth switch having a first terminal coupled to the second terminal of the driving transistor, a second terminal coupled to the sixth node, and a control terminal coupled to the fifth node; and
a capacitor having a first electrode terminal coupled to the first terminal of the first switch, and a second electrode terminal coupled to the control terminal of the driving transistor.

19. The display device according to claim 18, wherein the light emitting circuit further comprises:
a fifth switch having a first terminal coupled to the second electrode terminal of the capacitor, a second terminal coupled to an initialization signal terminal, and a control terminal coupled to a reset signal terminal; and
a sixth switch having a first terminal coupled to the initialization signal terminal, a control terminal coupled to the reset signal terminal, and a second terminal coupled to the second terminal of the fourth switch.

20. The display device according to claim 19, wherein the ultrasonic echo acquisition circuit further comprises:
a seventh switch having a first terminal coupled to the second electrode terminal of the capacitor, a second terminal coupled to the initialization signal terminal, and a control terminal coupled to the reset signal terminal; and an eighth switch having a first terminal coupled to the initialization signal terminal, a control terminal coupled to the reset signal terminal, and a second terminal coupled to the second terminal of the second switch.

* * * * *